(12) United States Patent
Konczak

(10) Patent No.: US 6,471,767 B1
(45) Date of Patent: Oct. 29, 2002

(54) PROCESS FOR RECYCLING GYPSUM-BASED WASTE MATERIAL INTO READILY CRUSHABLE MEMBERS FOR USE IN THE MANUFACTURE OF CEMENT AND CRUSHABLE MEMBERS FORMED THEREBY

(75) Inventor: Jeffrey J. Konczak, Valparaiso, IN (US)

(73) Assignee: American International Materials, Ltd., Blue Island, IL (US)

( * ) Notice: Subject to any disclaimer, the term of this patent is extended or adjusted under 35 U.S.C. 154(b) by 0 days.

(21) Appl. No.: 09/419,231

(22) Filed: Oct. 15, 1999

(51) Int. Cl.$^7$ .................................................. C04B 2/10
(52) U.S. Cl. ................. 106/739; 106/745; 106/772; 264/333
(58) Field of Search .............................. 106/739, 745, 106/772; 264/333

(56) References Cited

U.S. PATENT DOCUMENTS

| | | |
|---|---|---|
| 3,872,204 A | 3/1975 | Yano et al. |
| 4,101,332 A | 7/1978 | Nicholson |
| 4,146,402 A | 3/1979 | Kira et al. |
| 4,173,610 A | 11/1979 | Huller et al. |
| 4,250,134 A | 2/1981 | Minnick |
| 4,344,796 A | 8/1982 | Minnick |
| 4,354,876 A | 10/1982 | Webster |
| 4,377,414 A | 3/1983 | Buschmann et al. |
| 4,397,801 A | 8/1983 | Minnick |
| 4,502,901 A | 3/1985 | Burkard |
| 4,544,542 A | 10/1985 | Angevine et al. |
| 4,942,003 A | 7/1990 | Bold |
| 4,954,134 A | 9/1990 | Harrison et al. |
| 5,100,473 A | 3/1992 | Mitsuda et al. |
| 5,152,837 A | 10/1992 | Rademaker |
| 5,194,091 A | 3/1993 | Laney |
| 5,234,754 A | 8/1993 | Bache |
| 5,358,760 A | 10/1994 | Furlong et al. |
| 5,362,471 A | 11/1994 | Roth et al. |
| 5,487,764 A | 1/1996 | Ford, Jr. |
| 5,589,118 A | 12/1996 | Ford, Jr. et al. |
| 5,599,361 A | 2/1997 | Ford, Jr. |
| 5,626,667 A * | 5/1997 | Böhle ........................ 106/745 |
| 5,676,915 A | 10/1997 | Iiyama et al. |
| 5,698,027 A * | 12/1997 | Borgholm et al. .......... 106/739 |
| 5,738,694 A | 4/1998 | Ford, Jr. et al. |
| 5,752,993 A | 5/1998 | Eatough et al. |
| 5,766,339 A * | 6/1998 | Babu et al. ................. 106/745 |
| 5,769,940 A * | 6/1998 | College ...................... 106/745 |
| 5,807,420 A | 9/1998 | Eatough et al. |

FOREIGN PATENT DOCUMENTS

| | | |
|---|---|---|
| DE | 1912201 | 9/1970 |
| DE | 27 30 707 | 1/1979 |
| DE | 3621824 A1 | 1/1988 |
| EP | 0 169 508 | 1/1986 |
| JP | 06191915 | 7/1994 |
| SE | 566767 | 8/1977 |

\* cited by examiner

*Primary Examiner*—Paul Marcantoni
(74) *Attorney, Agent, or Firm*—Fish & Richardson P.C.

(57) ABSTRACT

A process for forming crushable, "synthetic" rocks from waste gypsum involves collecting natural and synthetic gypsum waste in the form of flue gas desulfurization ("FGD"). The gypsum waste has a sludge-like consistency and is passed through an extruder where the moisture in the waste gypsum is drawn off and the waste is densified. The removal of moisture is accomplished under vacuum. The densified waste gypsum is extruded through a die to create three-dimensional shapes with preselected aspect ratios.

21 Claims, 9 Drawing Sheets

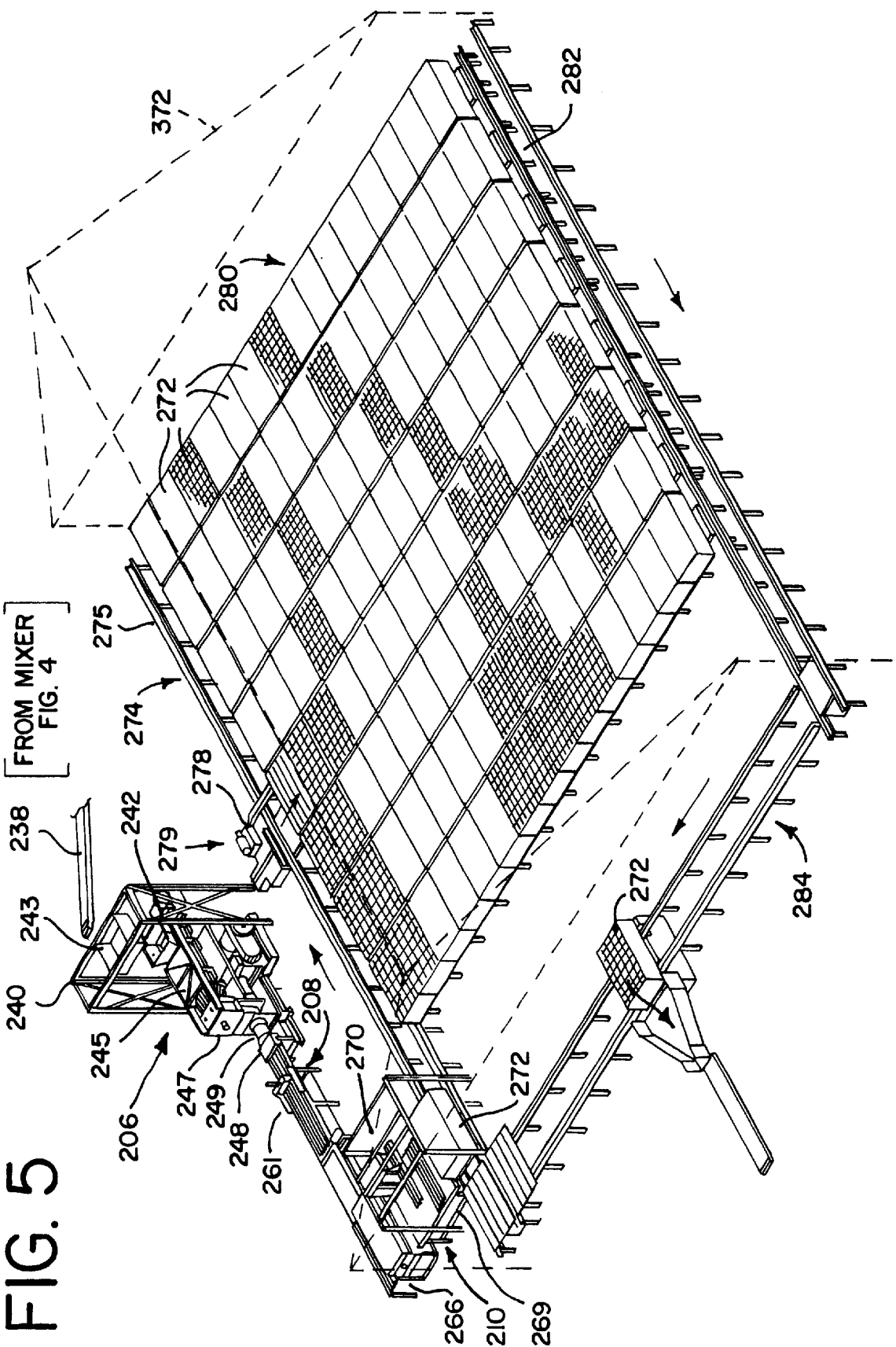

PROCESS FOR RECYCLING GYPSUM-BASED WASTE MATERIAL INTO READILY CRUSHABLE MEMBERS FOR USE IN THE MANUFACTURE OF CEMENT AND CRUSHABLE MEMBERS FORMED THEREBY

BACKGROUND OF THE INVENTION

The present invention relates generally to the manufacture of cement and, more particularly, to the use of gypsum and gypsum-based materials used in the manufacture of cements.

Cement generally refers to any material that initially has a plastic form and which is strongly adhesive after hardening. Cement, in the building and engineering context, usually refers to a fine, powdery substance that is processed so that it will adhere together and with other matters and hardens after being mixed with water. Most modem construction cements utilize gypsum, plaster or portland cement. Portland cement is named for a British cement maker, Joseph Aspdin, because of the resemblance that concrete made with his cement to portland stone, a greyish stone that was widely used in England for building construction. Aspdin's early portland cement was made from lime and clay, or shale, that were heated until they formed cinders and then ground into a fine powder. Those early cements, as with modem portland cements, were mixed with aggregates in the form of sand, or gravel, and water to form concrete, which is the most widely used construction material in the world.

Typically, portland cements are primarily mixtures of tricalcium silicate ($3CaO.SiO_2$), tricalcium aluminate ($3CaO.Al_2O_3$), and dicalcium silicate ($2CaO.SiO_2$). These three constituents are used in various proportions along with small amounts of magnesium and iron compounds. When such a cement is mixed with water, hydration occurs in the tricalcium silicate to form a gel-like hydrated silica and calcium hydroxide that eventually crystallizes and binds together with the particles of sand and gravel added to the cement to form a hard mass. This result in hard mass is typically referred to as concrete. Where the mixture contains only a fine aggregate, such as sand, the end product is referred to as portland cement mortar and where the mixture contains both fine and course aggregate, the later being in the form of stone or gravel, the end product is referred to as portland cement concrete.

Each element of the cement and concrete mix affects the overall chemistry of the end product, e.g., how fast it sets, its resistance to chemicals, etc. The tricalcium aluminate used in the cement largely produces an initial set of the mixture but does not contribute overall to the ultimate hardening of the mixture. The dicalcium silicate acts in a similar, deliberate manner. The tricalcium silicate causes rapid hardening of the cement or concrete. Special cements and concretes with special properties may be made by adding or decreasing the proportion of these compounds (and others) to obtain specific properties in the end products.

Gypsum is one such component and an important one at that, because of its effect on the retarding of the hardening process of cements/concretes. Gypsum is hydrated calcium sulfate ($CaSO_4.2H_2O$). Gypsum is a cost-effective component that retards the hardening process in portland cement and portland cement concrete significantly to permit the cement or concrete to be delivered, formed and worked while it is in a plastic form. Gypsum acts to reduce the initial rate of heat generation and reduces the rate of hydration of the tricalcium silicate. As an example of its important retarding properties, portland cement that does not use gypsum in its mix will set in about approximately four minutes, while cements/concretes that use gypsum will set in about four hours.

Gypsum is a widely distributed form of a sedimentary rock and it associates with saline deposits such as those formed by the precipitation of calcium sulfate from sea water, as well as with limestone and shale. Gypsum also occurs naturally in volcanic regions and in some clay regions where naturally occurring sulfuric acid has reacted with limestone. Gypsum is mined and crushed at mine locations into aggregate so that it may be eventually transported, usually by rail or truck, to its end user such as a cement plant or a sheet rock manufacturing plant. One by-product of this mining and manufacturing process is the production of gypsum "fines." Fines are very small particles that may pass through 100 mesh sieves. A 100 mesh sieve, as understood in the art and as used in this application is a sieve having 100 openings per inch.

The mass of these fines is comparable to their size and, as such they are very difficult to transport and utilize. Gypsum fines are usually mixed with water to form a slurry and then piped to a disposal area, such as a storage pit. These fines are too small to use in the manufacturing process of portland cement because they are difficult to transport. Additionally, these fines exhibit a natural tendency to clump together and form deposits, or clumps, that agglomerate during their travel through the cement-making process.

In the manufacture of portland cement, raw materials are mixed from deposits of limestone, cement rock, shale, clay, etc., and are crushed into chunks or rocks of the first processing size which are approximately 5 inches in general diameter. These chunks are then crushed a second time down to a suitable storage size which ranges to about 0.75 inches in diameter for separate storage. From there, the storage materials are sent to a grinding mill where they are mixed in appropriate proportions of approximately 60% lime, 19% silica, 8% alumina, 5% iron, 5% magnesia and 3% sulfur trioxide. This mixture is then conveyed to a grinding mill where the matter is ground into a powder and further stored.

This mixed raw material is then heated in a processing kiln in order to form cinders or, as referred to in the cement industry, "clinker." The kilns used for this task may be as long as 500 feet and have a diameter of approximately 12 feet. The kilns are slightly tilted in a horizontal plane. Raw materials are introduced into the upper end of the kiln, either in the form of dry rocks or as a wet paste, and as the kiln rotates, this raw material slowly progresses down to the bottom of the kiln, where an array of burners are located. Hot gases from these burners rise up the kiln to heat and dry the mixture as it progresses down the kiln. As the mixture approaches the base of the kiln, the raw material begins to fuse together to form the aforementioned clinker. In this process, water and carbon dioxide are driven off from the raw material by the kiln temperatures which typically will range from approximately 2700° F. to 2900° F. Once formed, the clinker is then cooled quickly and ground into a fine powder of about 3000 to about 5000 Blaine, where it may be conveyed by blowers, or the like, to storage silos. This finely ground product is a base portland cement. As mentioned before, the tricalcium silicate in this base cement would rapidly hydrate and harden in anywhere from about 4 to about 10 minutes. Gypsum is typically added at this point of the cement processing to retard the hydration of the cement when it is used in a mix. This gypsum is ground into the clinker during initial clinker grinding in proportions of anywhere between about 3% to about 10% by weight.

The gypsum used by cement plants is usually naturally mined gypsum. In order to control the addition of gypsum to the clinker in the correct proportions, cement plants need gypsum delivered to it in sizes that are easily crushable, for example, in rocks, or chunks, from about 1 to about 3 inches in diameter. These size chunks are easy to transport as compared to gypsum fines. More importantly, chunks or rocks of about this size are easily crushed by the cement processing equipment and because they approximately match the size of the clinker, they are more readily and reliably processed in the final grinding and mixing stage of cement processing.

Synthetic gypsum may also be used in the manufacture of cement. This synthetic gypsum is produced as a waste material during fossil-fired power generation. Stringent air pollution laws mandate limits in the amount of combustion products that are released into the atmosphere by a power generating plant. These limits are important to the power industry which burns fossil fuels, such as oil and coal, in order to form steam and generate electrical power. When a fossil fuel having a high sulfur content is burned, sulfur dioxide ($SiO_2$) is formed as a combustion by-product. In the past, this sulfur dioxide was exhausted to the atmosphere. However, today's environmental stands strictly reduce the amount of sulfur dioxide emissions that a power plant may release to the atmosphere.

In order to meet these limits, the power industry employs what are known as "scrubbers" as part of the exhaust systems on its power plants. These scrubbers utilize a high calcium content lime material which, when contacted with sulfur dioxide-laden air, forms sulfuric acid which reacts with the lime to form a solid material. This process is known as flue gas desulfurization and the resultant by-product is known as flue gas dust (FGD). This FGD is, in effect, a synthetic gypsum having the same chemistry as naturally occurring gypsum, namely hydrated calcium sulfate ($CaSO_4.2H_2O$) with nearly the same physical characteristics and properties as naturally occurring gypsum.

These scrubber systems are primarily wet systems, although some may be dry scrubber systems, and thus the FGD formed therein is wet and has the form of a sludge-like material. It is mixed with additional water by power plants so that it may be transported for collection in storage pits or lagoons to dry. Once dried, it is then carted away by the utility as a solid waste to either a landfill, or a sludge pond. Not only does it cost the utility money to have the product carted away, but landfill space is at an ever increasing premium. Therefore, it is very costly for power companies to dispose of their FGD waste in this manner.

Due to the gypsum content of this FGD, it has been utilized in the past in the production of cement. However, this use is not without difficulty in that it is desirable and often critical to have the gypsum, whether it be naturally or FGD-based gypsum, have a consistency so that it may be distributed in the final cement mix in the desire target percentage for the end cement mixture. The FGD has a moist and lumpy nature, when it is taken from a sludge pond, which prevents it from being distributed consistently in cement processing because it not only has a tendency to stick to or bridge in feed systems and hoppers. The wet nature of this FGD sludge causes deleterious sticking and bridging during cement processing and therefore further complicates the use of FGD in cement processing and so cement plants are reluctant to use FGD in such a manner.

It is therefore desirable to provide a means for processing waste gypsum and FGD into a form that may be reliably processed by a cement processing plant. The present invention is therefore directed, in its broadest sense, to a method for processing waste gypsum and FGD by solidifying the waste material under extrusion to both solidify and form the waste material into blocks for use in the processing of portland cement.

Other waste materials that are produced in the manufacture of portland cement can be recycled by the manufacturing plant, such as cement kiln dust and clinker cooler dust, which are particles of cement clinker and which share the same chemical composition as the cement clinker. These two waste particles take the form of a fine powder and present a disposal problem to the cement manufacturer similar to that of a utility and its FGD. Because these two waste materials are of almost the same composition as that of portland cement, they can be recycled into the manufacturing process. The present invention is therefore also directed in another sense to a method for processing waste gypsum and cement plant waste by recycling all of the waste materials into block-like forms that are crushable and hence, usable in the manufacture of cement.

SUMMARY OF THE INVENTION

It is therefore a general object of the present invention to provide a means for processing waste gypsum and/or FGD into a solid form that may be used with a high degree of consistency and reliability by a cement manufacturing plant in the processing to a cement mix.

Another general object of the present invention to provide a process for recycling waste gypsum and cement plant waste by extruding into a solid form that may be ground with cement clinker to form portland cement.

Another object of the present invention is to provide a method for solidifying waste gypsum from gypsum fines, FGD or FGD sludge, by extruding it under pressure in order to densify and solidify the gypsum waste into rocks or blocks having predetermined three-dimensional shapes with appropriate predetermined dimensions such that the shapes are easily crushed and ground to a desired consistency and size for use in the manufacture of portland cement.

Still another object of the present invention is to provide novel methods for solidifying waste gypsum sludge, fines, FGD sludge, wallboard waste gypsum, cement waste and fly ash into brick-like forms by mixing the materials together to form a mass, extruding the mass, without adding admixtures to the mass under pressure through a narrow passage to remove free water therefrom and densify the mass in order to obtain a homogeneous, solid composition that is easily transportable and crushable or grindable into predetermined various sizes for use in the processing of portland cements.

Yet a further object of the present invention is to provide a process for reclaiming waste gypsum for eventual use in the manufacture of portland cement, the process including the steps of collecting a predetermined amount of waste gypsum, providing an extrusion die having an opening with a predetermined geometric shape, providing an extruder having an extrusion chamber that defines a torturous path from one end of the extruder to the extrusion die, loading the extruder with the waste gypsum and extruding the waste gypsum through the extrusion die under pressure and vacuum to, in essence, "dehydrate" or "dewater" the waste gypsum and thereby form a solid, three-dimensional log of "green" waste gypsum of desired density, the log having matching that of the extrusion die opening, cutting the log of green gypsum in a direction generally transverse to the direction of extrusion to form a block of green waste gypsum, and letting the gypsum block dry to improve its handling characteristics.

A still further object of the present invention is to provide a process for producing solid, crushable objects from waste gypsum that are of a size similar to that of cement clinker for use in the manufacturing of portland cement, the process including the steps of collecting either natural waste gypsum or FGD or a combination of the two, the waste gypsum having a moisture content of about 0% to about 40% by weight, adding water to the waste material to provide a mass of waste material with a desired consistency, dehydrating and densifying the waste gypsum in a single step by passing the waste gypsum through an extruder under pressure and vacuum in order to remove moisture from the waste gypsum so that it has a moisture content of between from about 1% to about 10% by weight (preferably from about 5% to about 8% by weight) after extrusion and densification, passing the so-treated waste gypsum through a die having multiple die openings in order to form an array of "green" gypsum logs of three-dimensional shape, and cutting the array of logs in directions transverse to the direction of extrusion of the waste gypsum logs to form a quantity of multiple, densified synthetic gypsum waste rocks or chunks similar in size to cement clinker.

Yet another object of the present invention is provide a method for recycling gypsum-based waste materials and cement waste materials for use again by a cement manufacturing plant, the method including collecting gypsum-based waste and mixing it with preselected amounts of cement waste, such as cement kiln dust or clinker cooler dust, the amounts of the cement waste being relatively low in comparison to the gypsum-based waste, so that no substantial hydration and formation of cementitious material occurs, and running the waste mixture through an extruder in order to increase the density of the material by removing a substantial amount of free water from the waste mixture and extruding the densified mass through an extrusion die in order to form a green block of waste material having a preselected three-dimensional configuration, and letting the extruded block dry to eliminate most, if not all, of the free water or water of convenience of the mixture that lies on the surface of the particles and is not adsorbed or used by the particles of the components that make up the mixture.

The present invention accomplishes these objects in a unique and novel manner by providing solid, crushable blocks of synthetic gypsum waste that may be used by other industries, such as in the manufacture of portland cement, and thereby also provides an important process for recycling waste gypsum that otherwise would be deposited in landfills. The gypsum waste is chosen, in the preferred embodiment of the invention, from either natural gypsum waste in the form of gypsum fines resulting from the mining of gypsum, from synthetic gypsum in the form of high calcium sulfate FGD that is collected from flue gas desulfurization equipment. The FGD gypsum waste is collected in a wet, sludgelike form having a moisture content of between about 10% and about 40%.

In another aspect of the present invention, other non-gypsum-based waste products, particularly cement plant waste products, such as cement kiln dust, clinker cooler dust and fly ash may be added in dry form to the waste gypsum. This waste typically has a moisture content of about 0% by weight. The natural gypsum waste has a high percentage of calcium sulfate ($CaOSO_4$), that ranges from about 60% by weight to about 95% by weight, while the synthetic gypsum waste, that obtained from FGD, has a percentage of calcium sulfate that ranges from about 50% by weight to about 95% by weight. The natural gypsum waste (fines) may be mixed with the FGD gypsum waste to raise the final percentage of calcium sulfate to thereby improve the quality of the end product produced by the processes of the invention.

The waste mixture in a sludge form has a moisture content of about 20% to about 25% by weight and is conveyed to an extruder where it is both densified and dehydrated. The extruder preferably is one with one or more center shaft-driven augers and a series of restriction plates. Such an extruder is described in copending U.S. patent application Ser. No. 09/016,587, filed Jan. 30, 1998 and owned by the assignee of the present invention. The extruder dehydrates and densities the waste mixture, removing substantially all of the voids that occur in the waste gypsum and is put under a preselected partial to full vacuum inn order to draw off much of the moisture from the gypsum waste, in order to assist in the solidification and densification of the waste gypsum. The moisture is passed through at least one, and preferably two restriction plates in order to densify the waste gypsum and to even the extruding speed of the waste so that the extruded shapes are not extruded faster at the center of the end product near the auger shaft.

The restrictor plates also assist in removing a desired quantity of some of the moisture present in the waste gypsum so that the final "green" product that is extruded has a moisture content of between about 1% to about 20% by weight, with the preferred range being between about 5% to about 8% by weight. The extruder dehydrates the waste gypsum by, in effect, squeezing out much of the moisture and air from the waste material under both extrusion pressure and by placing the waste gypsum mixture under a vacuum to remove much of the air voids present in the gypsum waste. It also applies a shearing force to the particles that make up the waste material mass as it passes through the extruder, forcing the particles closer and closer together. This differs from the compression that is known in the art.

The resultant material is a dense, "green" extrusion in the form of a three-dimensional log, having a density of at least about 1.5 times greater than the density of the waste material entering the extruder. The waste is preferably extruded in an array of green logs, which are subsequently advanced to a cutting station where the array of green logs are cut transversely to the direction of extrusion to create a plurality of green blocks having sizes that approximately match that of cement clinker processed by cement plants. The green blocks are allowed to dry, either naturally or in an oven in order to reduce their moisture content down to an even lower level where the blocks may be easily handled for transport and use without fragmenting or fracturing. Oven drying may be the most appropriate means of drying to use when the process is located on the same site or nearby a cement processing plant and when immediate use of the gypsum blocks is desired.

Other waste materials may be used with the gypsum waste during the extrusion process, such as cement kiln dust, cooler clinker dust and/or flyash. The waste mixture will typically have a moisture content of between about 10% to about 25% by weight, after mixing and after addition of processing water, if needed, which remains as "free" water or water of convenience in the mixture. The waste is conveyed to a mixer where, if desired, wet and dry waste are mixed together in order to at least partially homogenize the waste mixture. It is then conveyed to an extruder that has one or more shaft-driven augers. The augers of the extruders convey the waste material through a restricted and narrow pathway to thereby solidify the waste sludge into a block form.

A vacuum chamber is incorporated into the extruder and preferably positioned between two augers in the extruder order to draw off much of the initial moisture of the mixture, of upwards of about 50% of the total moisture on the entering mixture. The vacuum applied pulls off much of the water as does passing the mixture through a narrow passage and/or restrictor plates. The resultant material is a homogenous, densified synthetic gypsum block or "rock", that may be formed into almost any desirable three-dimensional shape, especially shapes with an appropriate aspect ratio that matches that of cement plant grinding mill specifications. Virtually no hydration occurs in the products formed with these other cement waste materials because of their low relative percentages in the overall waste mixture and because the high calcium sulfate content of the gypsum-based waste materials will serve to significantly retard any hydration.

The extruded blocks or logs are somewhat damp when initially extruded. The green blocks may be dried, either in the atmosphere of in a drying oven that is incorporated in the process of the present invention. A suitable time period is relied upon, such as one day, in order to dry, typically by evaporation, of the particle surface moisture on the waste mass. Thus, the extruded blocks will develop a compressive strength in the nature of about 800 to about 1000 pounds per square inch, which strength is perfectly suitable for transport without excessive fragmentation or crumbling, but which is well below conventional structural strengths.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 5 is a perspective view of the remaining portion of the processing plant of FIG. 3, illustrating in detail, the waste gypsum extruding, cutting, palletizing and storage components of the plant;

DETAILED DESCRIPTION OF THE PREFERRED EMBODIMENTS

Figure 1:
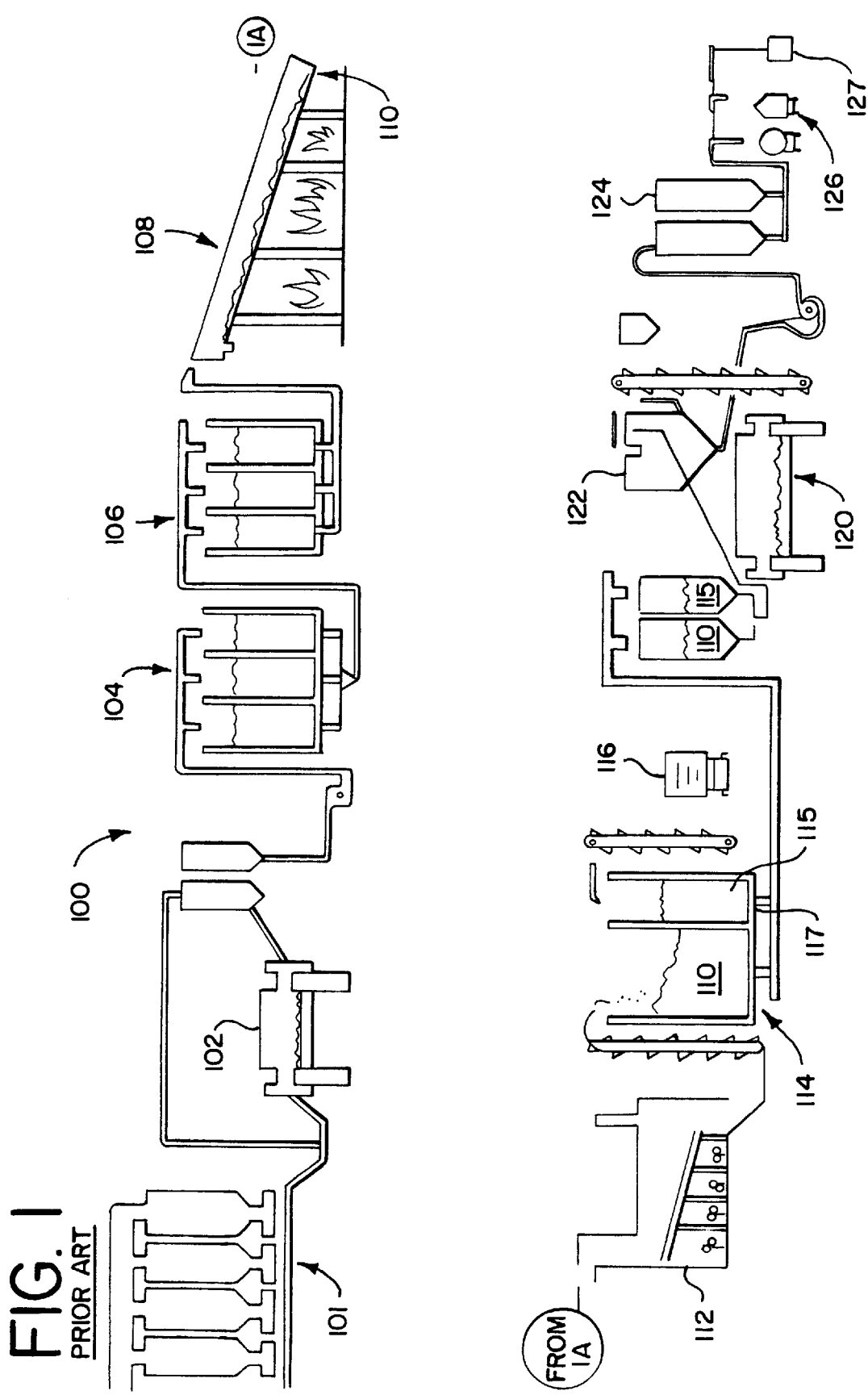
FIG. 1 is a schematic diagram of a typical cement processing plant.

The present invention relates to the recycling of gypsum-based, and other wastes by solidifying such wastes into a crushable form so that the waste gypsum may be utilized by industries that commonly use natural gypsum, such as, for example, the portland cement manufacturing industry and the gypsum-based wallboard manufacturing industry. The majority of the waste recycled in the processes of the present invention is gypsum-based waste. In the manufacture of portland cement, as shown best in the schematic diagram of a cement plant 100 of FIG. 1, raw materials, such as limestone, shale, clay, cement rock, etc. are proportioned at 101 and are ground into a powder at a grinding mill 102. The powder may be conveyed to a series of storage silos 104 where it may be further blended to form a desired raw mix that is either stored in additional storage silos 106 or sent to a kiln 108 for immediate processing.

In the kiln 108, the mix is heated to fusion temperatures of about 2700° F. to 2900° F., or more to form large rocks, or slugs, of what is known as cement "clinker". After heating the water in this material and driving off carbon dioxide, the material fuses together to form the clinker 110 which is then brought to a clinker cooler 112 for cooling typically under air pressure, and is subsequently transported to a clinker storage site, such as bin 114. Gypsum rock 115 is provided to the cement manufacturing plant 100 by way of a suitable transport means such as a railcar 116, truck, boat or barge. The gypsum rock 115 is provided in similar size to that of the clinker rocks, of about 3 inches in overall diameter. The gypsum 115 is stored in bins 117 near the clinker 110 so that the two similar size rock-like components, clinker 110 and gypsum 115 are properly proportioned into a mix 118 that is then ground into a fine powder in a grinding mill 120.

The grinding mill 120 typically will include a separator assembly 122 that separates out oversize chunks and rocks and transmits properly sized powder to a bulk storage site 124, from which it may be loaded into bulk transports 126, such as trucks, railcars, barges or boats, or packaged into bags 127. As stated earlier, the use of gypsum in the manufacture of portland cement is for the purposes of controlling the speed and degree of hydration of the mortar or concrete in which the portland cement is used. Certain waste products that are formed as the result of the manufacture of cement, such as cement kiln dust and clinker cooler dust are a bothersome waste to cement manufacturers. These waste products include the following chemical components: silicon dioxide ($SiO_2$), aluminum oxide ($Al_2O_3$), iron oxide ($Fe_2O_3$), calcium oxide (CaO), magnesium oxide (MgO), sodium oxide ($Na_2O$) and potassium oxide ($K_2O$).

The present invention is directed to a process for producing solid gypsum rocks in a crushable form and these rocks shall be referred to in this detailed description as "synthetic" gypsum rock because such rocks are produced from waste gypsum as explained below, rather than mined from naturally occurring deposits. Thus, the present invention affords the cement industry significant savings by eliminating the need and cost for gypsum mining and transport from gypsum mines. It also provides a means for recycling gypsum-based waste as synthetic gypsum rock or block from waste generated in the manufacture of wallboard for use in the manufacture of portland cement.

The gypsum waste that is used in the processes of the invention may be "natural" gypsum waste, such as gypsum fines which are a byproduct of the mining and sorting of gypsum rocks, or wallboard production or it may be "synthetic" gypsum waste, such as flue gas desulfurization residue ("FGD") that is produced as a byproduct of emission control when sulfur dioxide ($SO_2$) in exhaust air is reacted with high calcium-content lime material to form sulfuric acid which subsequently reacts with the lime to form solid and wet residue with a high proportion of calcium sulfate. As the lime becomes depleted, the residue must be removed so that newer and more reactive material may be applied to the scrubber to return its scrubbing efficiency. This FGD waste material is typically either carted by the producer to a landfill for disposal or mixed with water and deposited in a "sludge" pond, which are costly means of disposal. Natural gypsum waste for wallboard manufacture may also be used, provided that the outer facing paper that lines both sides of the inner core of gypsum is effectively removed prior to entrance into the extruder.

Figure 2:
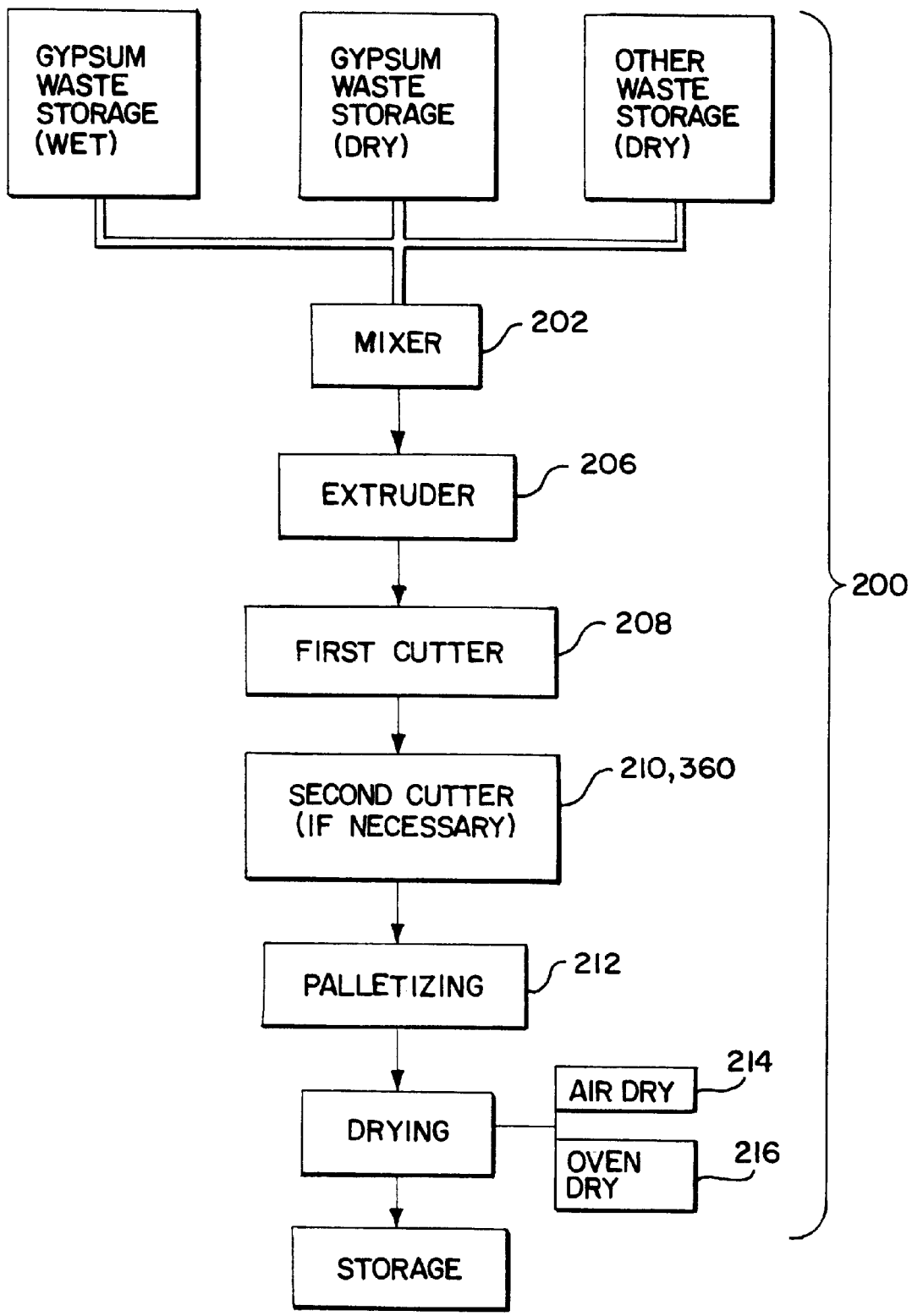
FIG. 2 is a schematic diagram of a waste gypsum processing line constructed in accordance with the principles of the present invention.

Both of the aforementioned natural and synthetic gypsum waste may be recycled for use by cement and/or wallboard manufacturing plants by forming it into solid shapes through the present invention. FIG. 2 is a schematic diagram of the process 200 of the present invention. Wet gypsum waste, usually in the form of a sludge, is conveyed to a mixer 202 where, if desired, it is mixed in a mixer with additional waste material. The mixer 202 serves to prepare a consistent and homogeneous mixture of the waste materials prior to the waste material mass entering the extruder 206. The mixer 202 does this by breaking up and substantially eliminating pockets of water, solids and/or air in the sludge.

This additional waste material may be in form of natural gypsum waste, such as dry gypsum fines, or it may be in the form of other desirable waste for cement processing such as cement kiln dust and clinker cooler dust, as well as other combustion waste, such as fly ash. All of these waste materials are dry waste materials and may be used in the form of fines, powders, granules and the like. These dry waste materials assist in lowering the moisture content of the overall mass of waste material (specifically, the gypsum-based waste) entering the extruder 206. Dependent on the moisture content of the FGD sludge, and the amount of dry waste such as gypsum fines, CKD clinker cooler dust or flay ash, water may be added to the waste material when it enters the extruder. The minimum moisture content of this waste material is preferably no less than about 5% by weight and preferably should be nor more than about 25% by weight. The water is added to bring the moisture content to a suitable level for processing, preferably about 10% by weight.

The mixed material may then be conveyed to a system extruder 206 of the type described in detail in copending U.S. patent application Ser. No. 09/016,587, filed Jan. 30, 1998, owned by the assignee of the present invention, the disclosure of which is hereby incorporated herein by reference. The extruder 206 produces three-dimensional shapes of a homogeneous gypsum waste composition that are cut into logs of first lengths by a first cutter 208, and which are subsequently cut into smaller blocks having a predetermined aspect ratio by a second cutter 210.

The blocks are produced in what may be termed as a "green" form in that they are still slightly damp to the touch, and having a moisture content of from about 1% to about 20% by weight, and preferably no more than about 10% by weight, although it is unlikely that the about 20% content would be used because of concerns of the ability of the extrudate to hold its shape in a green form and because of the time needed for drying of the extrudate. When dry, the blocks will have a preferred final moisture content of from about 1% to about 5%, by weight. As used in this application, "green" refers to a slightly damp state of the extrudate and is not meant to infer that they are of a state in which traditional "curing" will occur that results in hydration and the formation of a cementitious substance. Even though some of the cement waste materials are similar in composition to portland cement, such as the cement kiln dust and clinker cooler dust, the proportions of these materials is very low compared to the gypsum-based waste and the preponderance of the calcium sulfate present in the gypsum-based waste prohibits any substantial hydration reaction and hence no "curing" occurs, as that term is used in the cement and concrete industry.

These blocks may be palletized using a series of conveyors and rolling tables for intermediate storage purposes in a yard 214 where they may dry naturally in an enclosed area by contact with air, or moved through an oven 216 for drying and then moved on to storage.

Figure 3:
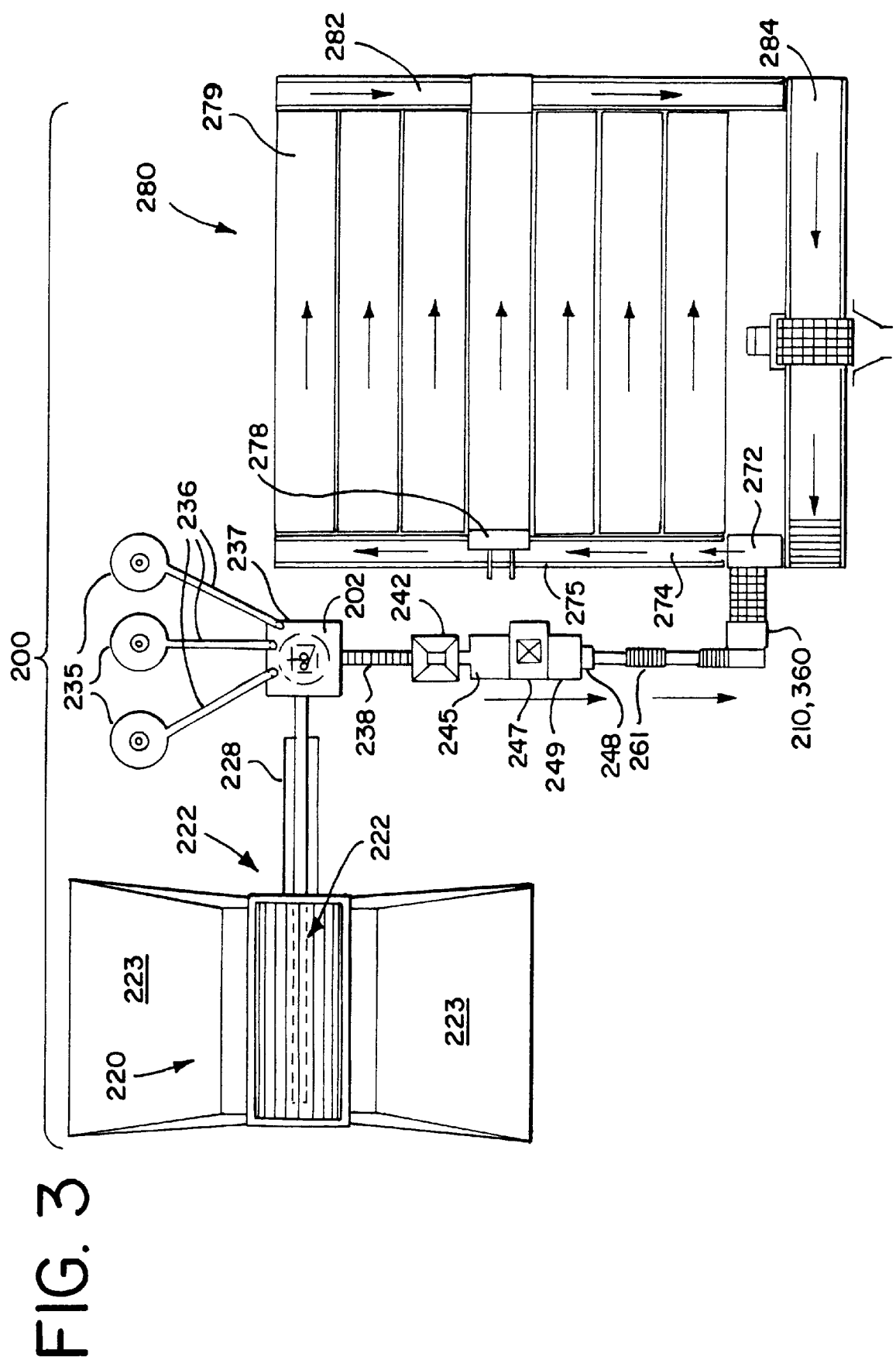
FIG. 3 is a top plan view of a processing plant constructed to effect the methods of the present invention.
Figure 4:
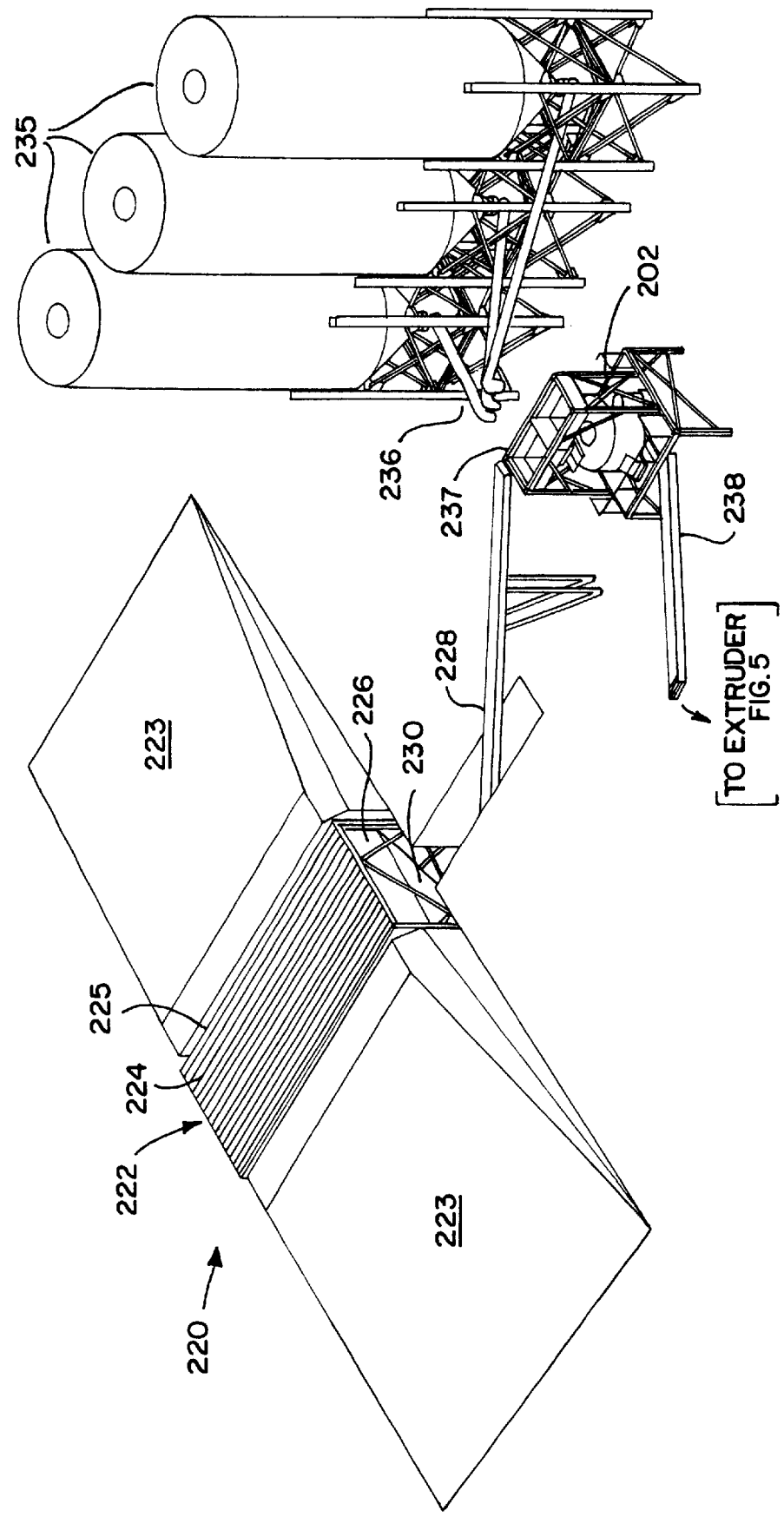
FIG. 4 is a perspective view of a portion of the processing plant of FIG. 3, illustrating in detail, the waste gypsum storage, transport and mixing components of the plant.

Turning now to FIGS. 3 & 4, a processing plant constructed in accordance with the principles of the present invention is shown generally at 200. The plant 200 includes a waste collection area 220, that may take the form of a drive-over collection pit 222 that is flanked by two opposing ramps 223 that are connected by a grating 224. The grating 224 will support vehicles driving over the pit 222, such as dump trucks (not shown) and has openings 225 formed therein that will permit the passage of gypsum waste therethrough.

The pit 222 preferably has one or more collection hoppers 226 positioned underneath the grating 224 that serve to channel the waste to a transport conveyor 228 that conveys the waste to a turbine mixer 202. The collection pit hoppers 226 may include grinders 230 at their bottoms to assist in moving the waste out of the hoppers 226 onto the conveyor 228. Dry waste, in the form of gypsum fines, cement kiln dust, cooler clinker dust and/or flyash, may be stored in appropriate storage structures, such as the silos 235 illustrated. In the use of gypsum fines that are produced in the mining of natural gypsum, the percentage of calcium sulfate will range between about 70% to about 90% by weight. The percentage of calcium sulfate in FGD will range between about 50% to about 95% by weight, depending on the desulfurization system used. The gypsum fines are preferably used in the process of the present invention to raise the percentage of calcium sulfate in the final extruded product. Each such silo 235 may have its own delivery tube 236 that extends over one of the collection hoppers 237 aligned with and positioned above the mixer 202. In the mixer 202, the waste materials are mixed together in preselected proportions and then deposited on a transport conveyor 238 that conveys the waste to an extruder 206.

Figure 5A:
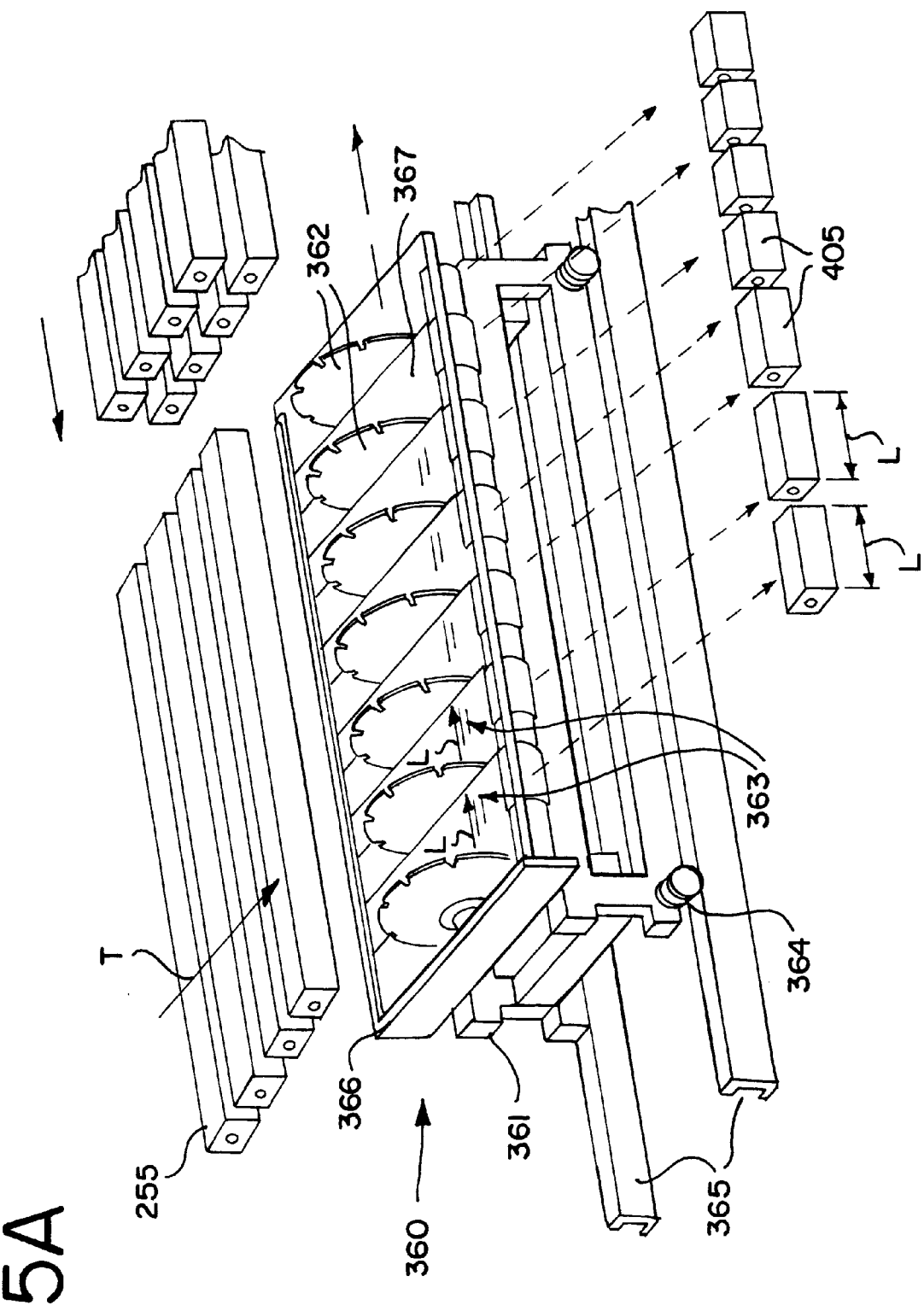
FIG. 5A is an enlarged detail view of a cutting assembly used in the processes of the present invention to cut the extruded logs into blocks having a particular aspect ratio.
Figure 6:
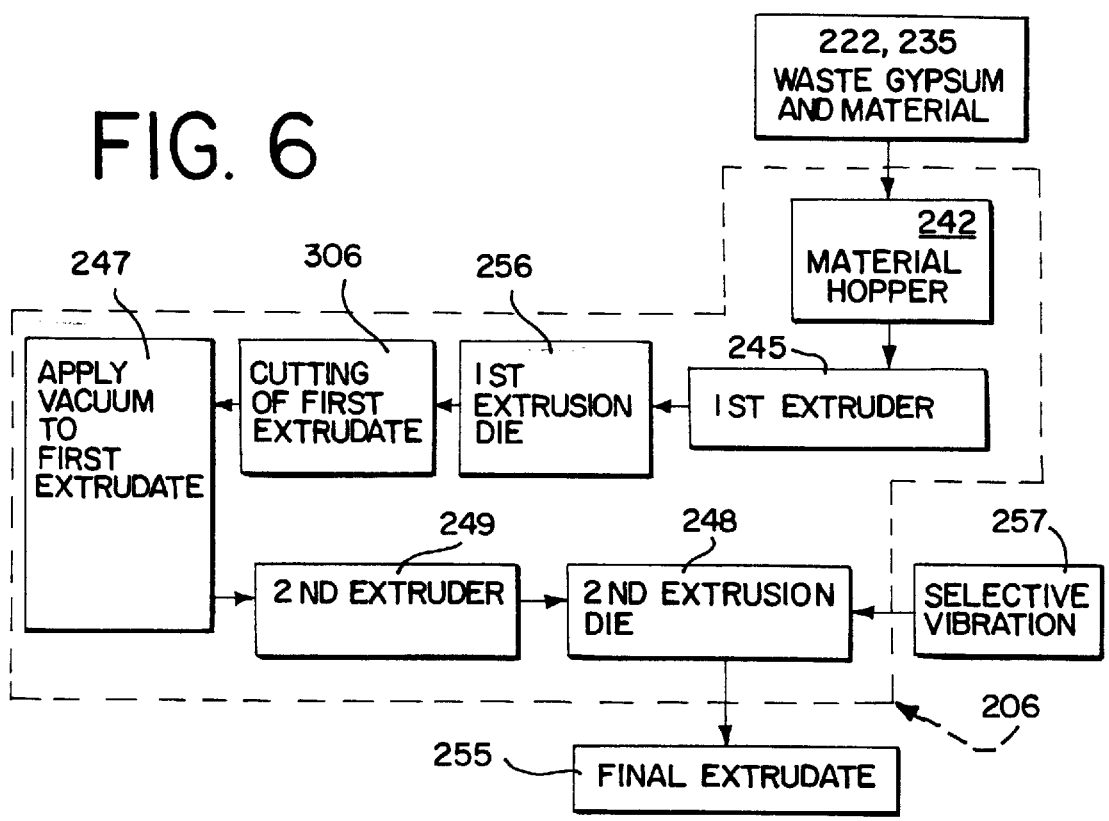
FIG. 6 is a flow diagram illustrating the process of extrusion and densification of the waste gypsum as it is passed through the extruder of the processing plant of FIG. 3.
Figure 7:
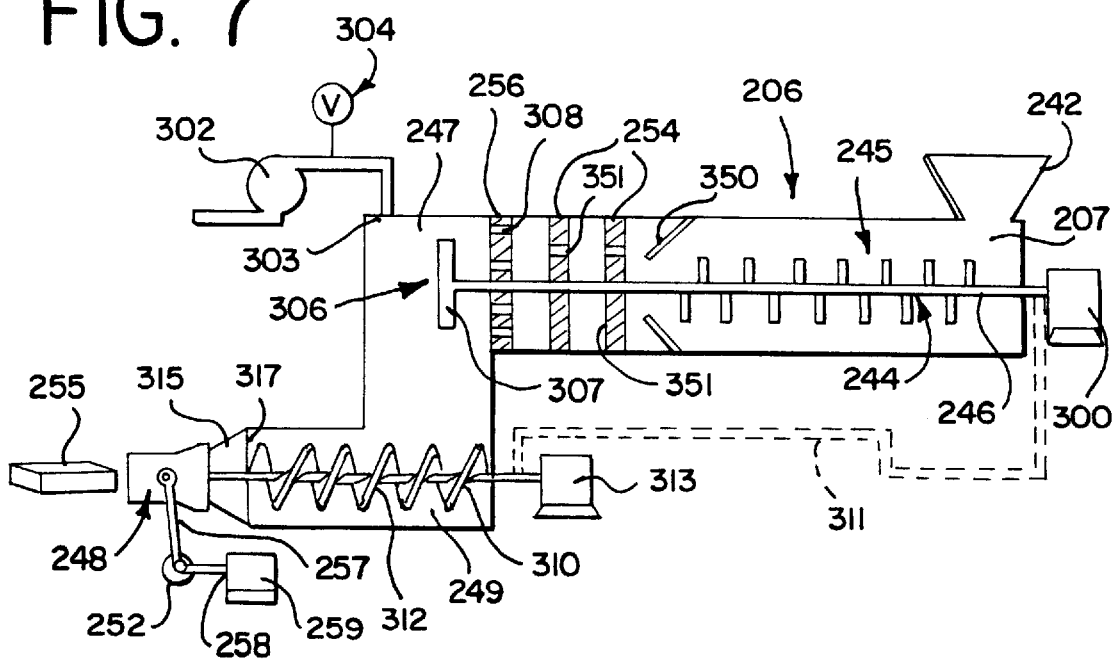
FIG. 7 is a cross-sectional view of an extruder suitable for use with the methods of the present invention.

As shown best in FIG. 5, the extruder 206 is supported on a frame 240 that supports not only the extruder, but also the different motors required to operate it. As shown in FIGS. 6 & 7, the extruder 206 has an entry hopper 242 disposed thereon in alignment with a hopper 243 supported on the frame 240 and in alignment with an entrance 207 of the extruder 206. From there, the gypsum waste mixture (in a wet form) is driven through a first extrusion passage 245 by way of a first auger 244 that is shown extending the length of the first extrusion passage 245 and which is driven on a drive shaft 246 by a motor 300. The first extrusion passage 245 includes a series of restrictor, or baffle plates 254, until it passes through a first extrusion die 256 into a vacuum chamber 247. The first extrusion passage 245 reduces down in diameter as shown at its exit end 350 (FIG. 7), and prior to it communicating with the vacuum chamber 247. The restrictor plates 254 have a series of openings 351 formed therein through which the waste material mass is passed under the urging of the first auger 244.

The vacuum chamber 247 is connected to a source 302 of negative air pressure that communicates with the chamber 247 by way of one or more vacuum ports 303. The vacuum that may be applied to the chamber 247 may range from about 1 inch to up to about 30 inches of vacuum. A vacuum monitor and control assembly 304 may be provided in order to monitor and to selectively control the vacuum applied to the gypsum waste mixture. This vacuum assists in the dehydration of the gypsum waste by drawing off a preselected amount of moisture therefrom. The water so drawn off may be expelled through associated piping 352.

In the vacuum chamber 247, and in proximity to the first extrusion die 256, there is rotatably mounted, a cutting or shredding assembly 306, having two or more cutting blades 307 and, as illustrated, that are operatively connected to the drive shaft of the first auger 244. The first extrusion die 256 preferably has a plurality of openings 308 formed therein through which the gypsum waste is passed under the urging of the auger 244. This extruded waste exits the openings 308 and comes into contact with the cutting assembly 306 which serves to cut up, or shred, the extruded waste mass from the form the waste mass takes as it is urged through the openings 308. Circular openings will commonly be used in this application.

This vacuum chamber 247 communicates with another extrusion passage 249 shown aligned with, but located beneath the first extrusion passage 245 and which itself communicates with a final extruder head 248. In order to assist with the collection and removal of water during the extrusion process, the vacuum chamber 247 is preferably formed as a vertical passage as illustrated and the vertical nature thereof facilitates in the location and operation of the cutting assembly 306. The passage of the waste materials through the restrictor plates 254 and through the vacuum chamber 247 serves to remove most of the air voids in the waste material. The other, or second, extrusion passage 249 also contains an auger 310 driven by a drive shaft 312, and preferably by a second motor 313, or through an operative linkage 311 with the first motor 300, at a preselected speed to effect movement of the gypsum waste through the second extrusion passage 249. In this second extrusion passage 249, the gypsum waste is further densified and is passed through a reduced opening 315, shown as a cone-shaped head 317 that communicates with a final extrusion die head 248.

The extruder head 248 preferably has a multiple opening die 250 associated therewith so as to efficiently machine an array of gypsum waste shapes, or "logs" 255. The extruder die head 248 is also preferably mounted in a somewhat "floating" manner to the extruder body and is connected to a vibration-imparting mechanism 251, shown in FIGS. 7 & 8 as a "shaker bar" 257 that is connected to an eccentric cam mechanism 252 that applies a selective vibratory force to the extruder die head 248 by way of a shaft 258 that connects the shaker bar 257 and die head 248 to a motor assembly 259. This vibration assists in urging the extruded gypsum waste logs 255 out of the die head 248 by reducing the resistance exerted by the extruder against the waste mass and assists the waste material flowing out of the die. Gaskets 318 may be utilized between the extruder die head 248 and the remaining body of the extruder 206 to effect a desired seal and to permit the floating action required.

Figure 8:
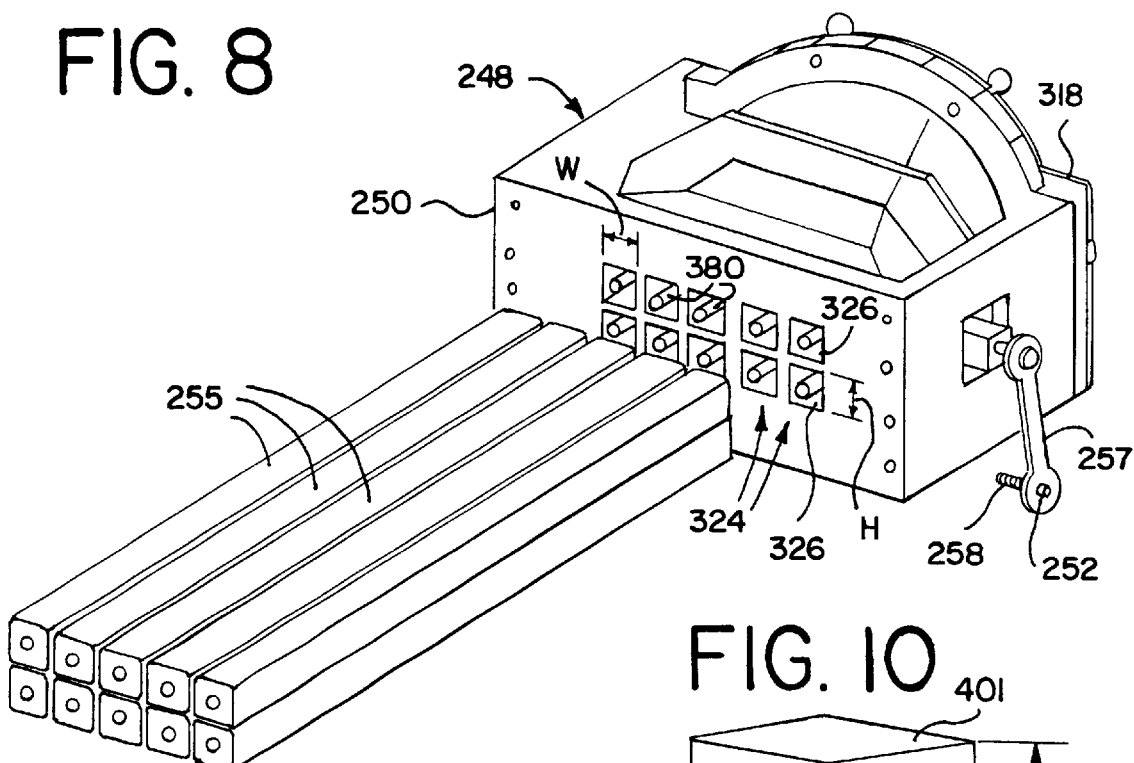
FIG. 8 is a perspective view of one embodiment of a multiple array extruder used in conjunction with the methods of the present invention and particularly useful in the processing plant of FIG. 3.

Importantly, the die head 248 incorporates a number of individual dies 324 arranged in an array 325 within the extruder die head 248, with each such die 324 having an associated opening 326 that forms a passage between the atmosphere and the interior portion of the die head 248. Alternatively, the die head 248 has a single die 250 with multiple openings. In any event, the openings 326, as illustrated in FIG. 8, have a given width W and are spaced close to each other in multiple rows, with two such rows being shown so that multiple rows of green gypsum waste logs 255 may be extruded simultaneously. Ten such opening are shown in FIG. 8, but it will be understood that any number of openings 326 arranged in any suitable array may be utilized. The openings 326 are not only of common widths, but also are identical in other aspects such as their heights H. Thus, consistently similar green logs may be extruded through the die head 248. This assists in cutting the logs 255 into final green blocks to obtain a particular aspect ratio. The extrusion of multiple logs 255 increases the efficiency of the overall process. The spacing between rows and adjoining openings is dictated by the strength of the material used to form the die head and its ability the resist the extrusion pressure generated by the extruder.

From the extruder die head 248, the waste gypsum logs 255 are advanced on a roller table or other suitable roller conveyor 261 to a first cutter 208 where the logs 255 are cut to a first length. Once cut, the logs 255, while still in an array, may be advanced to a transfer station 266. A lift transfer mechanism 268 is aligned with the second cutter 210, 360 and may be interconnected thereto by a transition conveyor 269. After the transfer station 266, the logs are cut a second time by a second cutter 210, which may include a cutter with an overhead blade assembly where the logs are cut into preselected lengths 400–405 in FIGS. 9–13, that preferably correspond to a preselected aspect ratio for use in cement processing. Alternatively, as depicted in FIG. 5A, the second cutter 360 may take the form of one or more carriages 361, each having a plurality of cutting blade assemblies 362 that are separated by intervening spaces 363 equivalent to the desired length L of the finished, green blocks. The cutter 360 and its carriage 361 are mounted on wheels 364 as shown in FIG. 5a, that roll along a pair of rails 365 so that it may be positioned in alignment with an array of green logs 255 just cut from the array of logs exiting from the extruder 206. The array of logs 255 are first moved parallel to the cutter 360, and then are moved in a transverse direction, as indicated by the arrow T in FIG. 5A. They slide along a leading edge 366 of the cutter 360 and into contact with the cutting blade assemblies 362, which rotate and cut the green logs into smaller green blocks 405, each block having a length L that at least approximates the lengths of the intervening spaces 363 between the cutting blades 362. In order to support the logs 255, the cutter 360 may include flat surfaces 367 within the intervening spaces 363.

Figure 14:
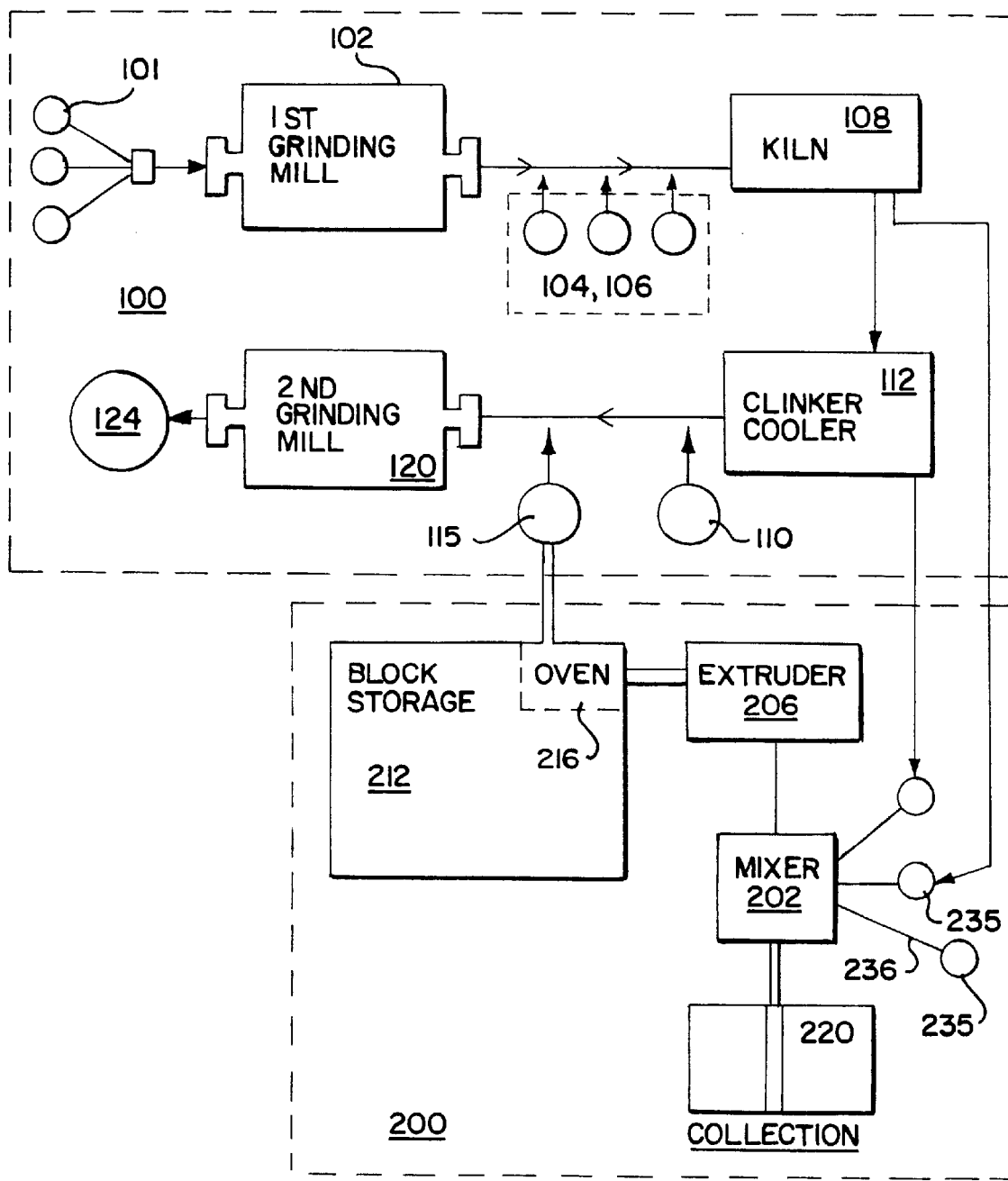

The cut blocks 400–405 are then transferred by a suitable means, such as a vacuum lift mechanism 270 onto a pallet 272 that may include a bin or storage element. The pallet 272 is movable on a series of roller tables, or conveyors, one of which, 274, is shown as aligned parallel with the axis of the extruder 206. This initial conveyor 274 may have a series of rails 275 associated therewith running alongside the conveyor 274 in order to support a transfer mechanism 278, such as the 90° push off mechanism 279 illustrated in FIGS. 3 and 5. This transfer mechanism 278 is movable along the rails 275 so that it may be selectively aligned with one of the roller tables 279 in order to transfer pallets 272 from the conveyor 274 to that specific roller table 279 selected from an array 280 of roller tables. The roller table array 280 are arranged in a direction parallel to that of the initial conveyor 274 and may have a second, output conveyor 282 located proximate thereto at the opposite ends of the table. This second conveyor 282 extends to a third conveyor 284 that, in essence, interconnects the two conveyors 274, 282 together. This third conveyor 284 serves to move a loaded pallet 272 to an unloading station 285 where the pallet 272 may be tipped to unload the cut logs to a storage facility, transport vehicle or even a conveyor that takes the blocks to a grinding mill of a cement plant. (FIG. 14.) The third conveyor 284 then returns the empty pallet to the first conveyor 274 where it is again loaded with green blocks. It can be seen that the roller tables and conveyors 274, 279, 284 cooperatively define a storage path along which the green blocks or logs may be moved. When done in an automated and controlled fashion, such as by a computer or other similar controller, the movement of the logs/blocks may be coordinated with the actual time needed for drying so that the logs/blocks are transferred from the storage path when they are done and ready for transport or grinding. In instances where the second cutter 360 is incorporated into a carriage 361, the cutter 360 may be moved along the path of the logs 255 exiting from the extruder to cut the logs 255 at any desirable and suitable location.

The array of roller tables 279 shown may be exposed to the atmosphere within the interior portion of a protective structure 372, where the green blocks may dry to their final desired moisture content, or it may serve to convey the green blocks (either on pallets or not) through a heated drying area, such as an oven 216, where the blocks will dry more quickly. It is important to note, as explained earlier, that the drying process of the present invention is not a curing process wherein a hydration reaction occurs as is what happens in the formation of cementitious products. The time involved in transferring the freshly extruded green logs to a discrete location on a specific roller table may be controlled with a suitable logic controller run by a conventional computer or other processor. The time may be selected to correspond to a desired time interval where the green logs 255 on the pallets 272 will have dried to a desired extent and have developed sufficient strength. The moisture content of the blocks when dry will be about 1–2% by weight. As explained further below, the process plant 200 may be set up on the site of a cement processing plant. The pallets 272 are seen to move in a somewhat circuitous manner along the storage path in order to return to their loading station 370.

As mentioned previously, the extrusion process, in effect, "dewaters" or "dehydrates" the gypsum waste mixture to both remove a large percentage of the moisture and to density the mixture so that it can maintain a solid form when "green" (i.e., when extruded from the extruder 206) and that is handeable and transportable when dry. It is believed that no hydration takes place in the waste mixture, especially when the secondary waste materials are used in conjunction with a high percentage (at least 75%) of gypsum-based waste material containing calcium sulfate. Thus, the logs that exit the extruder are a function both of dehydration and densification due to extrusion. With the absence of any hydration reaction, there is no cementitious bonding that occurs so that the extruded logs 255 have a shape and density suitable for transport without excessive fragmenting or splitting, but still are able to give some resistance to the crushing or grinding mills 120 of the cement plants in which they are intended for use. (FIG. 1.)

The density of the waste material entering the extruder 206 ranges from between about 70 pounds to about 90 pounds per cubic foot ("pcf"), while the extruded logs exiting the extruder 206 will range between from about 130 pcf to about 280 pcf, indicating that the extruder increases the density of the waste material through extrusion and dewatering by a factor of between about 1.5 to about 4. The amount of moisture present in the initial waste material affects the density of the waste material with a waste material having a density of about 70 pcf having more moisture than a waste material having a density of about 90 pcf.

The density of the waste material mixture is believed to increase by the extrusion process and the vacuum application. The extruder forces the waste material through a decreasing passage in the first extruder passage 245 as well as through the restrictor plate openings 351. This work performed on the waste material serves to subject the waste material mass to shearing forces, in contrast to compression forces as might be experienced in molding. This shearing results in the removal of the air pockets and voids from the waste material mass. It also forces the particles of the constituents of the waste material mass closer together. The vacuum assists in this process and also assists in the removal from the waste material mass of excess moisture, or "water of convenience" rather than water of absorption by any of the particulate matter in the waste material mass. The water of absorption remains in the waste material mass and some of this moisture, believed to be the particle surface moisture, is given off during the drying stage. The final moisture content of the waste material mass as it exits the extruder is important because it affects the shape of the block being formed.

The following waste mixtures were run through a lab-scale extruder to determine the efficacy of the process and to determine the efficacy of different waste components to use in the logs and blocks of the mixture. All percentages are in terms of percentage weight.

EXAMPLE 1

100% synthetic gypsum waste in form of FGD

EXAMPLE 2

93% FGD waste

7% CKD (cement kiln dust)

EXAMPLE 3

83% FGD waste
10% Clinker cooler dust
7% CKD

EXAMPLE 4

83% FGD waste
10% Class "C" fly ash
7% CKD

EXAMPLE 5

73% FGD waste
10% Clinker cooler dust
10% Class "C" fly ash
7% CKD

EXAMPLE 6

93% FGD waste
7% CKD
1 oz. per 100 lbs. of mix concrete water reducer

These mixtures were extruded into 2-inch by 2-inch logs and cut at 2-inch lengths to form 2-inch cubes having an aspect ratio of about 1:1. They were dried in a convection tunnel oven at 170° F. for about 15 minutes. The cubes for all of the mixtures above were then tested for compressive strength at the following time intervals: 1 day, 3 days and 5 days. The cubes were tested for compressive strength in units of pounds per square inch (psi) at these intervals and the following results were noted:

| 1 Day | 3 Days | 5 Days |
| --- | --- | --- |
| 300–400 psi. | 800 psi. | 800–1000 psi |

It can be seen that the test cubes of the Examples developed a sufficiently large strength for transport and handling at 1 day with a compressive strength of between about 300 to about 400 psi. An even more suitable compressive strength of about 800 to about 1000 psi was seen to develop at from about 3 to 5 days after initial extrusion, with even yet greater compressive strengths of about 1400 psi developing at about 14 days from initial extrusion. The secondary waste materials did not affect the development of the strength of the extrudate. Importantly, brief drying of about 1 day produces a compressive strength that is suitable (about 300 to about 400 psi) for the transport and handling of the blocks without excessive flaking, fragmenting or crumbling. The compressive strengths that the blocks of the present invention achieve are low, non-structural compressive strengths, which further indicate that no hydration reaction occurs to a significant degree in the waste material mixture that results in the formation of a cementitious network as would be found in either a portland cement mortar or a portland cement concrete. It is believed that some localized hydration may occur, but the large predominance of calcium sulfate in the waste material from the gypsum-based waste is so great compared to the cement kiln dust and clinker cooler dust that any significant amount of hydration will be retarded by the calcium sulfate.

It is believed that the percentage of waste gypsum may be as low as about 70% by weight with the remaining, secondary waste materials being no more than about 30% by weight of the extruded product, such waste materials typically being selected from the group of cement kiln dust, clinker cooler dust and flyash. The limitation on the amount of these secondary materials will depend on their chemical content and the specification of the final cement product produced by a cement plant, keeping in mind the crushable blocks of the present invention as not intended for use as structural building materials, but are to be used in place of natural gypsum. For example, the amount of cement kiln dust in most instances will be limited to about 7% by weight of the waste mixture so as not to exceed either sulfur or magnesium levels in the final grind of portland cement, but some specialized cement grinds may want higher levels of these constituents.

Figure 9:
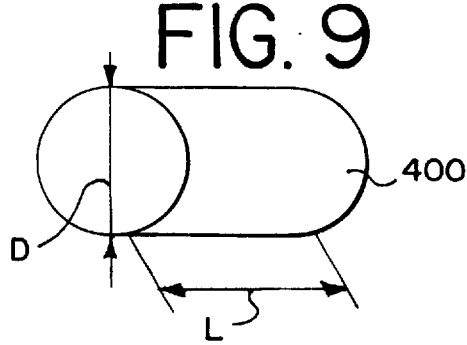
FIG. 9 is a perspective view of one type of block or log of synthetic gypsum produced in accordance with the principles and methods of the present invention, and illustrating a cylindrical-type block or log.
Figure 10:
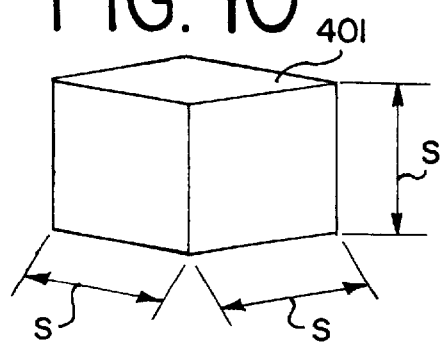
FIG. 10 is a perspective view of one type of block or log of synthetic gypsum produced in accordance with the principles and methods of the present invention, and illustrating a cube-type block or log.
Figure 11:
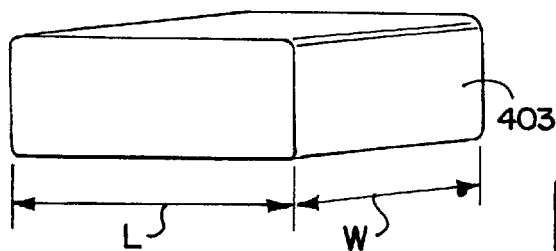
FIG. 11 is a perspective view of one type of block or log of synthetic gypsum produced in accordance with the principles and methods of the present invention, and illustrating a brick-type block or log.
Figure 12:
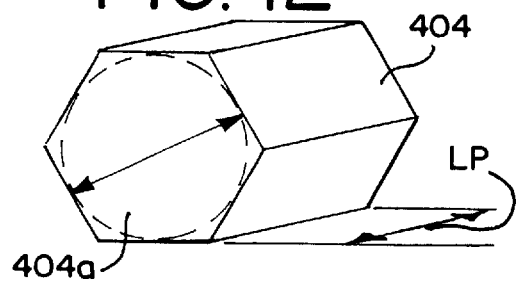
FIG. 12 is a perspective view of one type of block or log of synthetic gypsum produced in accordance with the principles and methods of the present invention, and illustrating a hexagon-type block or log.
Figure 13:
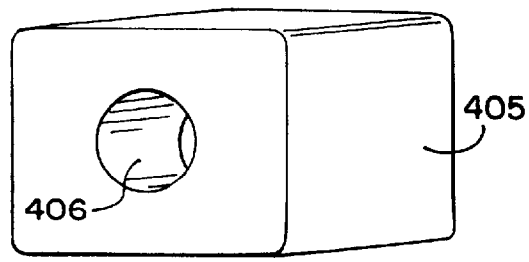
FIG. 13 is a perspective view of one type of block or log of synthetic gypsum produced in accordance with the principles and methods of the present invention, and illustrating a cube-type block or log having a center opening; and, FIG. 14 is a schematic view of a combined cement manufacturing plant with a synthetic gypsum process of the present invention incorporated therewith.

Turning now to FIGS. 9–13, a series of log shapes and configurations are illustrated. FIG. 9 illustrates a cylindrical log 400 having a preselected diameter D and length L. FIG. 10 illustrates a cube 401 having substantially even side lengths S. FIG. 11 illustrates a rectangular log 403, while FIG. 12 illustrates a hexagonal block 404 having general overall diameter $D_H$ and a length $L_H$. The extruder die head 248 may also include center shafts 380 positioned in its die openings 326 in order to produce the log 405 illustrated in FIG. 13. The shafts result in the formation of a central hole, or passage 406 in the log 405, which will assist in the eventual drying of the green log by increasing the surface area thereof that is exposed to the atmosphere.

As previously mentioned, the blocks formed from the process of the present invention are desired to have a certain aspect ratio. The term "aspect ratio", as used herein has the same meaning as it has in the concrete processing industry, namely, the ratio of one dimension to another, typically the length to diameter of a concrete cylinder. For cylindrical blocks 400 such as that shown in FIG. 9, the aspect ratio is L/D, where L is the length of the cylinder and D is the diameter of the cylinder. In a cube 401 as shown in FIG. 10, the aspect ratio will be S/S where S is the length of a side of the cube 401. In the rectangular prism block 403 shown in FIG. 11, the aspect ratio will be L/W, where L is the length of the face of the prism 403 and W is the width of the prism 403. In the polygonal block 404 shown in FIG. 12, the aspect ratio will be $L_p/D_p$ where $L_p$ is the length of the block and $D_p$ is the mean diameter of the polygon taken from the face 404a of the block 404 as shown.

By means of the aspect ratio, the blocks that are formed by the present invention may better approximately match the specification for a cement plant for its gypsum rock. Making the blocks of the present invention within a certain range of aspect ratios, also aids in determining what sizes of blocks are appropriate for travel from an overall size concern. For example, a cube will always have an aspect ratio of 1:1, while a preferred cylinder-type block 400 will have an aspect ratio of 1:1 or an absolute value of about 1 (i.e., 1/1=1). As the aspect ratio climbs, for example to an absolute value of about 2 taken from a ratio of 4:2 for a cylinder of the type 400 shown in FIG. 9, the length L of the block increases significantly to about 4 inches, while the diameter D is rather wide at about 2 inches. The large length of these blocks will hamper the transport of the blocks and is likely to lead to fragmentation and crumbling of the blocks during transport. The preferred configuration of the blocks is a cube of the type shown in either FIG. 10 or 13, but the other configurations are suitable provided that the value of the aspect ratio is maintained in the range of about 1.0 to about 2.5 (absolute value) and the ratio itself maintained in the range of about 1:1 to about 2.5:1.

It can be seen therefore that the present invention provides a means for recycling waste that is normally sent to a landfill or sludge pond, such as FGD, gypsum fines, waste wallboard, and cement manufacturing waste such as cement kiln dust and clinker cooler dust, as well as certain combustion waste such as fly ash. The recycling of this material saves valuable landfill space and also preserves a natural resource, gypsum. It significantly reduces the cost of cement manufacture in that a cement manufacturer can use the synthetic gypsum rock made in accordance with the principles of the present invention and the production may occur on or close to the cement manufacturing plant. Such a layout is shown in FIG. 14, wherein a synthetic gypsum rock/block plant 200 is located proximate to a cement plant 100 so that the manufacturing processes of the two plants may be effectively integrated together.

As illustrated in FIG. 14, the cement plant 100 includes a storage and proportioning station 101 in line with a first grinding mill 102. Storage bins or silos 104, 106 receive the rough grind and hold it prior to roasting the grind in a kiln 108 that is in line with a clinker cooler. Storage areas 110, 115, such as bins, silos or the like are provided to receive the cooled cement clinker and gypsum prior to these two materials being mixed and ground together in the second grinding mill 120. After grinding with gypsum 115, the finished cement in sent to a storage area 124 for eventual dispensing.

A synthetic gypsum processing plant 200 is incorporated into the cement plant 100 and includes a waste collector 220 to receive primary gypsum-based waste material. A mixer 202 is used to mix the gypsum-based waste to a desired consistency as well as mix other secondary waste materials with it, such as cement kiln dust from the kiln 108 and clinker cooler dust from the clinker cooler 112. A suitable transfer mechanism may employ pipes or other transfer means to convey these wastes in either a dry or wet form to storage areas 235. After mixing, the waste material is passed through the extruder 206 and formed in to dense, green logs or blocks that are dried and stored at 212. The dried blocks are then conveyed to the gypsum storage area 115 of the cement plant.

While the preferred embodiment of the invention have been shown and described, it will be apparent to those skilled in the art that changes and modifications may be made therein without departing from the spirit of the invention, the scope of which is defined by the appended claims. For example, the shapes of the blocks may be changed to suit a particular grinding mill, and other sources of waste gypsum may be utilized in the processing of the logs and blocks of the invention.

What is claimed:

1. A process for manufacturing portland cement using recycled gypsum, the process comprising:

(A) preparing a rough grind of lime bearing materials;

(B) roasting the rough grind to form cement clinker;

(C) cooling the cement clinker;

(D) preparing synthetic gypsum rock from gypsum-bearing waste materials by:

(1) providing a mass of gypsum-bearing waste material having a calcium content of at least about 50% by weight and a moisture content of between about 5% to about 25% by weight;

(2) dewatering and densifying the gypsum-bearing waste material by passing it through an extruder while draining moisture from the gypsum-bearing waste material;

(3) forcing the dewatered and densified gypsum-bearing waste material through a configured opening of the extruder to serially form green blocks having a moisture content of at least about 4% by weight, immediately after extrusion;

(E) mixing the synthetic gypsum rock together with the cement clinker; and, (F) grinding the mixed synthetic gypsum rock and cement clinker to form a granular portland cement.

2. The process of manufacturing portland cement as set forth in claim 1, further including applying a vacuum to the gypsum-bearing waste material mass as it passes through the extruder for drawing off the moisture from the gypsum-bearing waste material mass.

3. The process of manufacturing portland cement as set forth in claim 2, wherein the extruder includes a pair of distinct first and second extrusion passages, the first and second extrusion passages being spaced apart from each other and respectively including first and second extrusion augers operatively supported therein, and the extruder further includes a vacuum chamber operatively connected to a source of negative air pressure to provide a vacuum affecting the gypsum-bearing mass of waste material passing through the vacuum chamber.

4. The process of manufacturing portland cement as set forth in claim 1, wherein the green blocks have a density of between about 130 and 280 pounds per cubic foot.

5. The process of manufacturing portland cement as set forth in claim 1, wherein the gypsum-bearing waste material includes gypsum fines, flue gas desulfurization, wallboard waste material, and/or mixtures thereof.

6. The process of manufacturing portland cement as set forth in claim 4, wherein the extruder includes a die head having an array of distinct die openings disposed thereon and in communication with the extruder, each die opening having an associated width, whereby the extruder may be used to extrude simultaneously multiple distinct green blocks of the gypsum bearing waste material, each block having a width equal to the associated width of the die opening through with the block was extruded.

7. The process of manufacturing portland cement as set forth in claim 6, further including cutting the array of green blocks into green blocks of first lengths, and subsequently cutting the first length green blocks into multiple green blocks having second lengths that are smaller than the first length, the second lengths being chosen such that an aspect ratio of the second length green blocks ranges between about 1:1 to 1:2.

8. The process of manufacturing portland cement as set forth in claim 7, wherein the second lengths are chosen such that the aspect ratio of the second length green blocks is about 1:1.

9. The process of manufacturing portland cement as set forth in claim 6, including transferring the second length green blocks to a pallet and drying the second length green blocks until the second length green blocks have a compressive strength of at least about 400 psi.

10. The process of manufacturing portland cement as set forth in claim 9, wherein drying the second length green blocks includes moving the pallet through an oven assembly.

11. The process of manufacturing portland cement as set forth in claim 1, wherein the green blocks are cubes.

12. The process of manufacturing portland cement as set forth in claim 1, wherein the green blocks are rectangular prisms.

13. The process of manufacturing portland cement as set forth in claim 1, wherein the green blocks are cylinders.

14. The process of manufacturing portland cement as set forth in claim 1, wherein the green blocks are polygonal prisms.

15. The process of manufacturing portland cement as set forth in claim 1, wherein the extruder opening has a solid member positioned therewithin, the solid member forming a central opening in the green blocks.

16. The process of manufacturing portland cement as set forth in claim 1, further including adding secondary waste material to the mass of gypsum-bearing waste material, the secondary waste material including cement kiln dust, cooler clinker dust, fly ash, and/or mixtures thereof, wherein the secondary waste material does not exceed at least about 30% by weight of a weight of the gypsum-bearing waste material.

17. The process of manufacturing portland cement as set forth in claim 6, wherein each of the die openings has a solid member disposed therein such that each of the green blocks extruded therethrough has an opening formed therein that extends lengthwise of the green block so as to increase the surface area thereof.

18. The process of manufacturing portland cement as set forth in claim 11, further including:

providing a storage pathway for moving the green blocks formed by the extruder to a storage area;

providing at least one transport pallet movable along the storage pathway;

transferring the green blocks extruded from said extruder to the pallet and moving the pallet to a storage location along the storage pathway.

19. The process of manufacturing portland cement as set forth in claim 18, wherein the storage pathway includes roller tables that define a circuitous path and the roller tables convey the pallet over the circuitous path to a storage location.

20. The process of manufacturing portland cement as set forth in claim 18, wherein the extruder die has multiple and distinct die openings formed thereon so that a multiple array of green blocks are extruded by the extruder, and the multiple array of green blocks are transferred to the transfer pallet.

21. The process of manufacturing portland cement as set forth in claim 6, further including vibrating the die head while extruding the multiple distinct green blocks therethrough.

\* \* \* \* \*